UNITED STATES PATENT OFFICE.

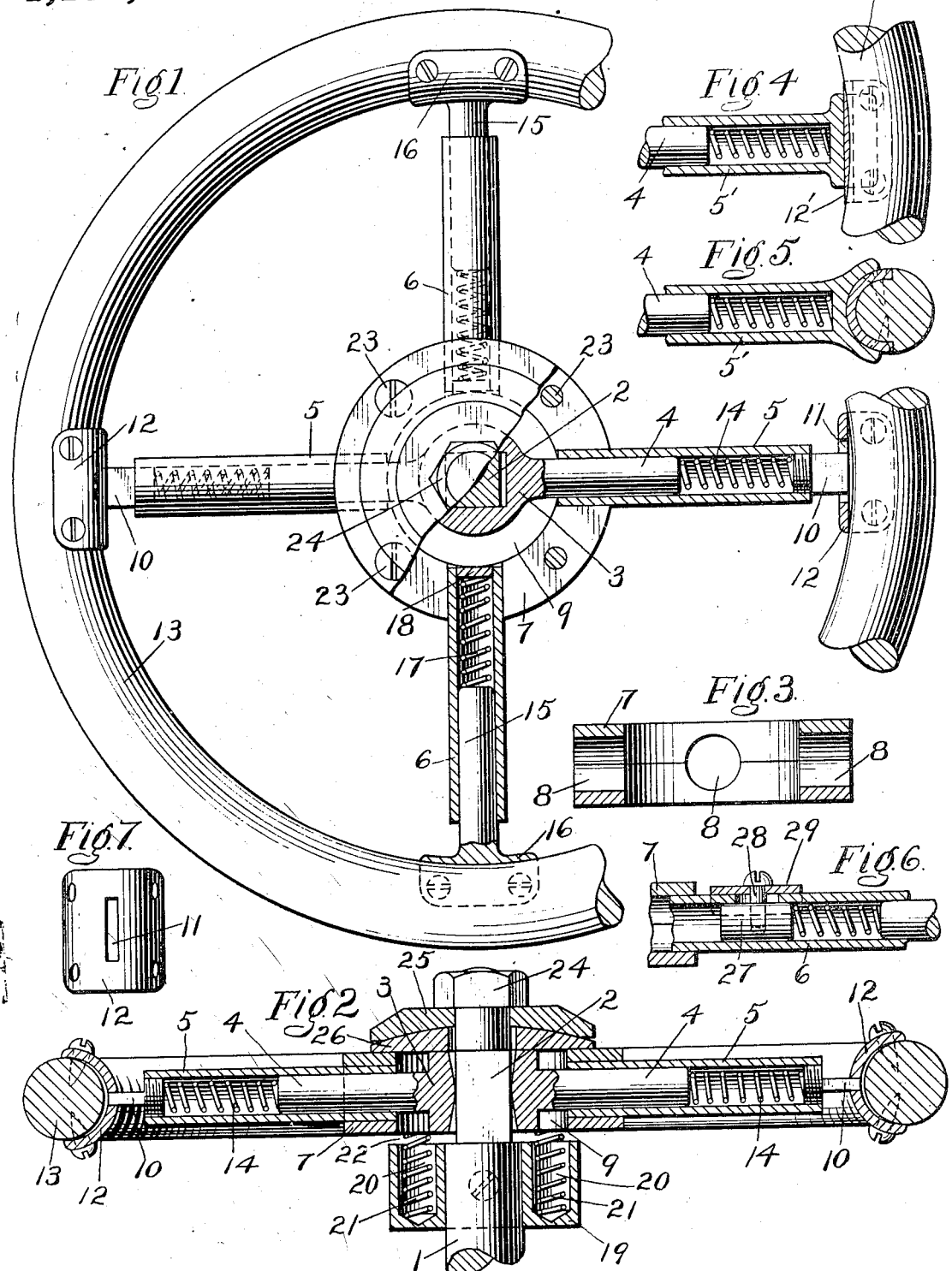

HENRY C. CLEVE, OF WASHINGTON, DISTRICT OF COLUMBIA.

HAND-WHEEL FOR AUTOMOBILES.

1,142,307.          Specification of Letters Patent.        Patented June 8, 1915.

Application filed October 30, 1914. Serial No. 869,423.

*To all whom it may concern:*

Be it known that I, HENRY C. CLEVE, a citizen of the United States, residing at Washington, in the District of Columbia, have invented new and useful Improvements in Hand-Wheels for Automobiles, of which the following is a specification.

This invention relates to motor vehicles, and more particularly to a hand or steering wheel therefor.

When running an automobile, the operator is obliged to have his hands constantly applied to the steering wheel, and by reason of the continual jarring of the car in passing over the road, vibratory movements are set up which are transmitted to the hand wheel and make the holding of the wheel very tiresome, especially on long trips. This vibratory action is also accentuated by the fact that the hand wheel is carried by a long, unsupported shaft.

The principal object of my invention is to provide means for absorbing vibratory movement transmitted to the hand wheel, in other words, to provide a non-vibratory hand wheel.

In the accompanying drawing; Figure 1 is a plan view, partly in section, of an automobile hand wheel, with my improvement applied thereto; Fig. 2 a central vertical section thereof; Fig. 3 a central vertical section of the split collar employed in the above construction; Fig. 4 a fragmentary plan view, partly in section, showing a modification of the means for permitting relative movement of the hand wheel spokes with respect to the rim; Fig. 5 a vertical section thereof; Fig. 6 a vertical section of a hand wheel spoke, showing a modified arrangement whereby the tension of the spoke spring may be adjusted; and Fig. 7 a face view of one of the rim clips employed in the construction shown in Figs. 1 and 2.

According to a preferred form of my invention, the hand wheel rim, instead of being connected to the shaft by rigid spokes, in the usual way, has yielding resistances, such as coil springs, interposed between the rim and the shaft, so that vibratory movements of the shaft are absorbed by the springs and are not transmitted to the rim.

As shown in Figs. 1 and 2 of the drawing, the steering shaft 1 may be provided near the outer end with a squared portion 2 upon which is mounted a yoke 3 having parallel faces adapted to slide on corresponding faces of the squared portion 2 and adjacent faces formed of opposite inclines, so as to permit a rocking movement of the yoke on the squared portion in one direction. Extending from opposite sides of the yoke 3 are trunnions 4 adapted to reciprocate within corresponding sleeves 5 forming spokes of the hand wheel. The sleeves 5 as well as sleeves 6 forming the other spokes of the hand wheel are secured in position by means of a split collar 7 having apertures 8 for the reception of the inner ends of the sleeves and provided with a central opening 9 for the yoke 3, which is of sufficient size to permit relative movement of the yoke within the collar. Secured to the outer end of each sleeve 5 is a guide piece 10 having a flat end adapted to move laterally in a slot 11 formed in a clip 12 adapted to be secured to the rim 13 of the wheel. Between the adjacent ends of the piece 10 and the trunnion 4 a coil spring 14 is interposed which is adapted to take up lateral movement of the trunnion 4 within the sleeve. Within each sleeve 6 of the other wheel spokes is mounted a sliding pin 15 having a clip portion 16 adapted to be secured to the wheel rim 13 and a spring 17 is interposed between the inner end of the pin 15 and a plug 18 at the inner end of the sleeve. Below the yoke 3, a collar 19 is secured to the shaft 1 and is provided with a plurality of recesses 20 for coil springs 21. Normally, there is a clearance space 22 between the wheel and the top face of the collar 19 and the springs 21 extend out so as to engage the under face of the collar 7, so that longitudinal vibrations of the shaft 1 may be taken up by the compression of said springs.

In assembling the parts, the trunnions 4 of yoke 3 are inserted in the sleeves 5 and these sleeves together with the sleeves 6 are placed in the half round apertures of the lower section of the split collar 7. The upper section thereof is then applied and the two sections with the sleeves are securely clamped in position by means of screws 23. The springs 17 are now placed within the sleeves 6 and the sliding pins 15 are inserted. After inserting the springs 14 within the sleeves 5, the pieces 10 are secured to the ends of the sleeves, with the flat portion arranged in the plane of the wheel. In order to apply to the rim 13, the clips 12 are placed on the flat portion of the pieces 10 and are held inwardly until the rim is in position and then the clips are moved outwardly to the rim, on which they are secured by screws. The sliding pins 15 are pressed inwardly against the springs 17, so that the rim 13 can be sprung into position, after which the clips 16 are screwed to the rim. The yoke 3 is now slipped over the squared end of shaft 1 and is held in position by means of a nut 24 applied to the end of the shaft. In order to permit a rocking movement of the wheel, washers 25 and 26 may be interposed between the wheel and the nut 24, one washer having a convex surface adapted to bear against a concave surface of the other washer and the washer 26 having a clearance space around the shaft 1, so as to permit the desired rocking movement relative to the shaft. The same result may be attained by employing a spring collar similar to the collar 19, which can be secured to the shaft 1 above the wheel instead of the nut and washer construction. It will now be seen that lateral vibrations of the shaft in one direction are absorbed by movement of the yoke 3 and the trunnions 4 against the springs 14, while lateral vibrations at right angles to the above are absorbed by movement of the sliding pins 15 against the springs 17. In this case, since the entire spoke mechanism takes such vibrations, provision is made for the free movement of the sleeves 5 by permitting lateral play of the flat ends of the pieces 10 within the slots 11. Longitudinal vibrations of the shaft are absorbed by the springs 21 and a rocking tendency of the shaft is permitted by the construction of the yoke 3 so that the same can rock on the squared end of the shaft.

In Figs. 4 and 5 of the drawing, a slightly modified arrangement is shown for permitting relative movement of the sleeves, in which the sleeve 5' is provided at the outer end with a cylindrical bearing face adapted to slide laterally on a corresponding face of the clip 12'.

In order to provide uniformity in the action of the springs in the sleeves, without necessity of making same exactly alike, I may insert a plug 27 within the sleeve and longitudinally slot the sleeve for the reception of a screw 28 having screw threaded engagement with the plug, preferably placing a washer 29 between the sleeve and the head of the screw. The plug 27 is adjusted so as to bear against the end of the spring as desired and then the screw 28 is tightened, to hold the plug in place. The springs in the sleeves may be placed under initial compression if deemed necessary, by varying the length of the springs and suitably adjusting same.

Having now described my invention, what I claim as new and desire to secure by Letters Patent, is:—

1. The combination with a steering shaft for a motor vehicle, of a hand wheel for operating said shaft, comprising a rim, a yoke mounted on the shaft and provided with trunnions, sleeves forming spokes of the wheel and connected to the rim to permit relative lateral movement and containing said trunnions, and springs mounted in said sleeves for resisting lateral movement of the trunnions.

2. The combination with a steering shaft for a motor vehicle and a hand wheel for operating said shaft, of a yoke mounted on the shaft and rotatable therewith, sleeves forming spokes of the wheel, trunnions carried by said yoke and slidable in said sleeves, springs for resisting movement of the trunnions, other sleeves forming spokes at right angles to the first mentioned sleeves, pins secured to the rim of the wheel and slidable in said sleeves, and springs for resisting movement of said pins in the sleeves.

3. The combination with a steering shaft for a motor vehicle, of a hand wheel for operating said shaft comprising a rim, a collar surrounding said shaft, radial sleeves secured to said collar and forming wheel spokes, a yoke secured to the shaft and having oppositely extending trunnions slidable in one pair of sleeves, pins secured to the rim and slidable in another pair of sleeves disposed at right angles to the first pair and a slidable connection between the first pair of sleeves and the rim to permit lateral movement of said sleeves.

4. The combination with a steering shaft for a motor vehicle having a key shaped end, of a hand wheel adapted to be applied to said end and slidable longitudinally thereon, a collar secured to said shaft and springs carried by said collar for opposing longitudinal movement of the shaft relative to the wheel.

5. The combination with a steering shaft for motor vehicles, of a hand wheel for operating said shaft comprising a rim, a yoke mounted on said shaft and provided with trunnions, sleeves forming spokes of the wheel and extending substantially from the hub to the rim and containing said trunnions, and springs mounted within said sleeves between the trunnions and the rim.

6. The combination with a steering shaft for motor vehicles, of a hand wheel for operating said shaft comprising a rim, a hub, sleeves secured to the hub and forming spokes, pins secured to the rim and movable within the sleeves, other sleeves forming spokes and slidable within the hub, and trunnions carried by the shaft and movable within the last mentioned sleeves.

In testimony whereof I have hereunto set my hand.

HENRY C. CLEVE.

Witnesses:
 HENRY W. OFFUTT,
 R. H. CHARLES.